May 16, 1939.  A. J. PIPERI  2,158,912
BEATER
Filed Jan. 10, 1939  2 Sheets-Sheet 1

Inventor
Anthony J. Piperi

By Clarence A. O'Brien
and Hyman Berman
Attorneys

May 16, 1939.  A. J. PIPERI  2,158,912
BEATER
Filed Jan. 10, 1939  2 Sheets-Sheet 2
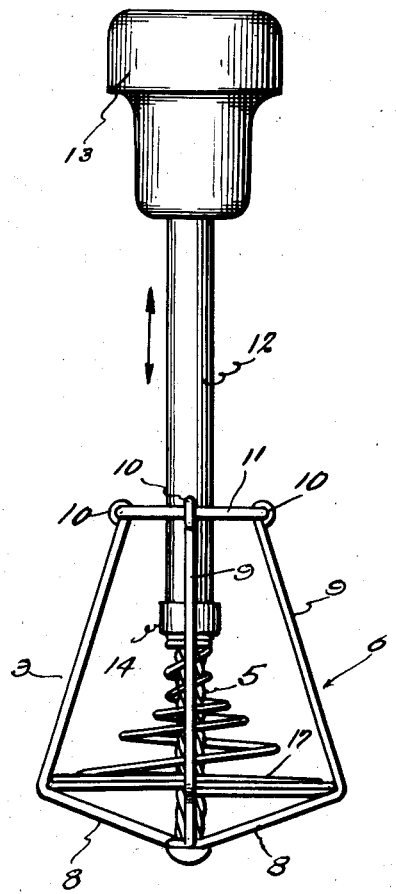
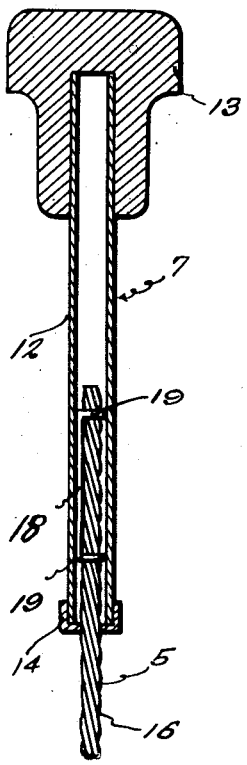
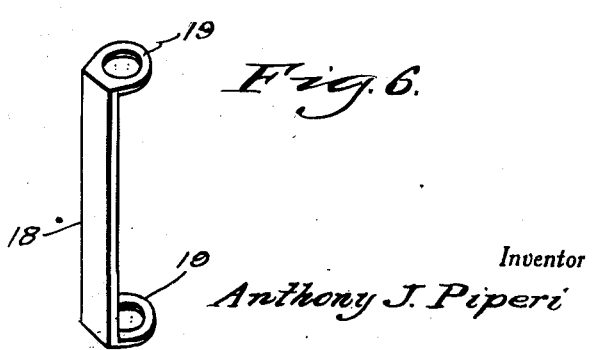
Inventor
Anthony J. Piperi
By Clarence A. O'Brien
and Hyman Berman
Attorneys Patented May 16, 1939

2,158,912

UNITED STATES PATENT OFFICE 2,158,912

BEATER

Anthony J. Piperi, Galveston, Tex.

Application January 10, 1939, Serial No. 250,207

2 Claims. (Cl. 259—128)

This invention relates to a beater for foodstuff, and more particularly to that class or type known as "rotary" beaters; and the invention together with its objects and advantages will be best understood from a study of the following description taken in connection with the accompanying drawings wherein:

Figure 2 is a view similar to Figure 1 but with the handle of the beater at substantially the limit of its down stroke.

Figure 3 is a detail sectional view taken substantially on the line 3—3 of Figure 1.

Figure 6 is a perspective view of a tie element.

Figure 1:
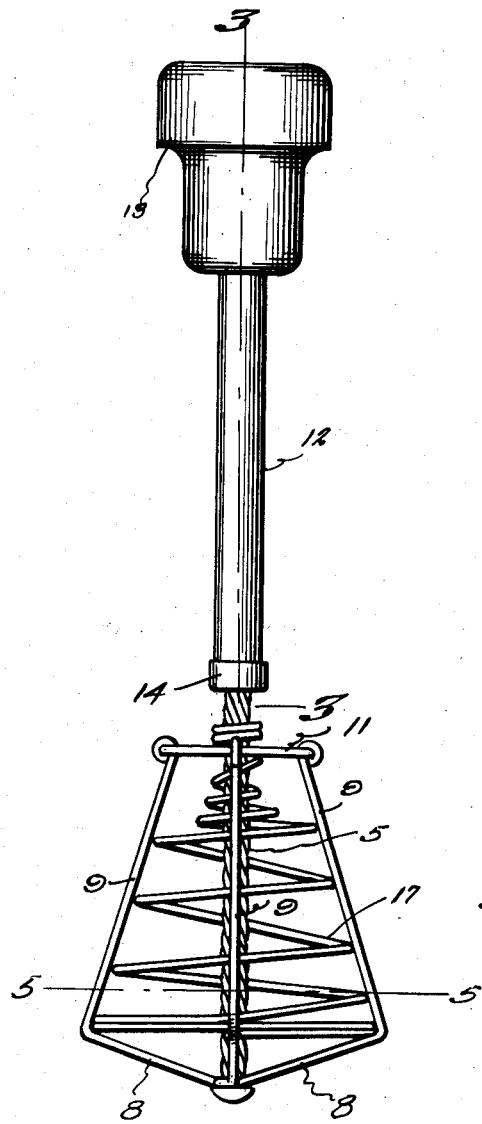
Figure 1 is an elevational view of the beater.
Figure 4:
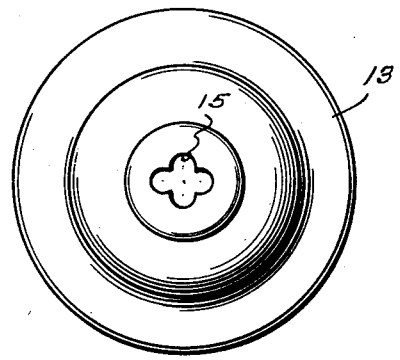
Figure 4 is a bottom plan view of the handle of the beater.
Figure 5:
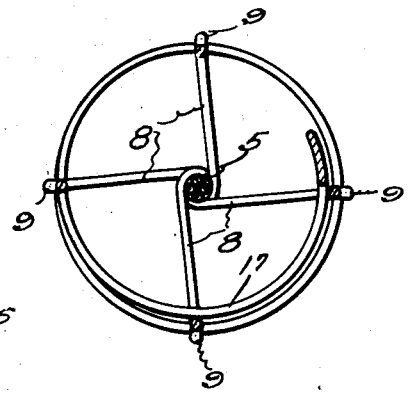
Figure 5 is a horizontal sectional view taken substantially on the line 5—5 of Figure 1.

Referring more in detail to the drawings it will be seen that in the preferred embodiment thereof the beater comprises essentially a shank 5 having at one end thereof a head 6. Slidably associated with the shank 5 is a handle 7, and the handle 7 and shank 5 are complementarily formed or equipped for causing the beater to rotate in one direction by means of the lowering movement of the handle relative to the shank of the beater.

In the preferred embodiment thereof the shank 5 and head 6 are formed integral, being formed from a plurality of strands of wire relatively twisted about one another for a major portion of the length of the wires to provide the shank 5. The free ends of the wire rods are then bent laterally outwardly and upwardly relative to one another to extend from the shank substantially radially to the axis of the shank as at 8 and then upwardly and inwardly at angles to the portions 8 as at 9. The terminals of the portions 9 of the wires forming the shank 5 and head 6 are then bent to provide eyes 10 accommodating a spacer ring 11 which serves to maintain the beater members 9 substantially equi-distantly apart.

The handle 7 comprises a tubular member 12 that is sleeved on the shank 5 and is equipped at one end with a knob or hand-grip 13.

On the other end of the member 12 of the handle 7 is a flanged cap 14 centrally perforated as at 15 to complement the spiral groove 16 in the shank 5.

Disposed on the lower end of the shank 5 within the confines of the head 6 is a tapered spiral spring 17, the lower and larger convolutes of which engage in the angles between the connecting parts 8 that serve to connect the beater elements 9 with the shank 5. At the smallest end thereof the spring 17 is arranged to be engaged by the driving cap 14 as the handle 7 moves downwardly on the shank 5 to effect a rotation of the beater shank 5 and head 6 in one direction.

From the above it will be apparent that upon the downward working stroke given to the handle 7 shank 5 and associated head 6 of the beater will rotate in one direction and the handle 7 coming into contact with the spring 17 upon the downward working impulse given to the handle will in an obvious manner compress the spring 17 as indicated in Figure 2 of the drawings. Manifestly continuous operation of the handle 7 on its power and return strokes will cause the head 6 and shank 5 of the beater to continuously rotate for whipping or thoroughly mixing the foodstuffs being acted on thereby.

Also, and as shown in Figure 8, the ends of the strands of wire forming the shank 5 and head 6 of the beater at the upper end of the shank are secured together through the medium of a tie plate 18 that at opposite ends thereof is provided with integral eyes 19 that are sleeved on the shank 5. Also the member 18 will serve as a stop to limit the upward movement of the handle 7 relative to the shank 5.

It is thought that a clear understanding of the construction, utility, operation and advantages of a beater embodying the features of the present invention will be had without a more detailed description.

Having thus described the invention what is claimed as new is:

1. In a foodstuff beater, a spirally grooved shank provided at one end thereof with an integral head, a driving handle mounted on the shaft to travel lengthwise thereof in opposite directions and provided to act to rotate the shank when moved in one direction, said shank and head being formed of a plurality of strands of wire, said wire strands at one end thereof being relatively twisted together to form said spirally grooved shank, and having the free ends thereof bent outwardly and upwardly, and merging into beater elements converging towards the shank at the free ends of said beater elements, and a spacer ring connected with the free ends of the beater elements, and a tapered coil spring arranged within said head and disposed about said shank, said coil spring having the major end thereof engaging the portions of the wire rods forming said head with the minor end of said spring arranged in the path of said driving handle to be engaged thereby upon movement of the driving handle in one direction relative to said shank, said driving handle including an elongated tubular part accommodating said shank, and a tie member on the free end of said shank to hold the relatively twisted shank-forming portions of said wire strands together.

2. In a foodstuff beater, a spirally grooved shank provided at one end thereof with an integral head, a driving handle mounted on the shank to travel lengthwise thereof in opposite directions and acting to rotate the shank when moved in one direction, said shank and head being formed of a plurality of strands of wire, said wire strands at one end thereof being relatively twisted together to form said spirally grooved shank, and having the free ends thereof bent outwardly and upwardly and merging into beater elements converging toward the shank at the free ends of said beater elements, and a tapered coil spring arranged within said head and disposed about said shank, said coil spring having the major end thereof engaging the portions of the wire rods forming said head with the minor end of said spring arranged in the path of said driving handle to be engaged thereby upon movement of said handle in one direction relative to said shank, said driving handle including an elongated tubular part accommodating said shank, and a tie member on the free end of said shank to hold the relatively twisted shank-forming portions of said wire strands together.

ANTHONY J. PIPERI.